(12) United States Patent
Hecht

(10) Patent No.: US 9,028,180 B2
(45) Date of Patent: May 12, 2015

(54) CUTTING TOOL AND CUTTING HEAD WITH A RESILIENT COUPLING PORTION

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 495 days.

(21) Appl. No.: 13/439,652

(22) Filed: Apr. 4, 2012

(65) Prior Publication Data

US 2013/0266389 A1  Oct. 10, 2013

(51) Int. Cl.
  *B23B 27/16* (2006.01)
  *B23B 51/02* (2006.01)

(52) U.S. Cl.
  CPC ............ *B23B 51/02* (2013.01); *Y10T 408/9095* (2015.01); *B23B 27/16* (2013.01); *B23B 2251/02* (2013.01)

(58) Field of Classification Search
  CPC .............. B23B 1/0473; B23B 2240/00; B23B 2240/32; B23B 2251/02
  USPC .......... 408/144, 226, 227, 230, 231; 403/252, 403/253, 254
  See application file for complete search history.

(56) References Cited

U.S. PATENT DOCUMENTS

| | | | |
|---|---|---|---|
| 2,621,548 A | 12/1952 | Williams | |
| 5,228,812 A | 7/1993 | Noguchi et al. | |
| 5,863,162 A | 1/1999 | Karlsson et al. | |
| 6,059,492 A | 5/2000 | Hecht | |
| 6,695,551 B2 | 2/2004 | Silver | |
| 6,783,308 B2 * | 8/2004 | Lindblom | 408/230 |
| 7,048,480 B2 | 5/2006 | Borschert et al. | |
| 7,407,350 B2 | 8/2008 | Hecht et al. | |
| 7,603,410 B1 * | 10/2009 | Chang et al. | 709/203 |
| 2003/0091403 A1 | 5/2003 | Lindblom | |
| 2010/0143059 A1 | 6/2010 | Hecht | |
| 2010/0155144 A1 | 6/2010 | Cramer et al. | |
| 2012/0003056 A1 | 1/2012 | Jaeger | |

FOREIGN PATENT DOCUMENTS

| | | | |
|---|---|---|---|
| JP | 2005-153112 | | 6/2005 |
| JP | 2005169542 A | * | 6/2005 |
| JP | 2006088308 A | * | 4/2006 |
| JP | 2006231434 A | * | 9/2006 |
| JP | 2011036977 A | * | 2/2011 |

OTHER PUBLICATIONS

International Search Report dated Jul. 18, 2013 issued in PCT counterpart application (No. PCT/IL2013/050197).

* cited by examiner

*Primary Examiner* — Sunil K Singh
*Assistant Examiner* — Alan Snyder
(74) *Attorney, Agent, or Firm* — Womble Carlyle

(57) ABSTRACT

A cutting head having a cutting end and an opposite coupling end along a longitudinal cutting head axis; having a cutting head length; and including two major surfaces and a peripheral surface. A male coupling portion extends rearwards from the coupling end, between a base portion and a rear surface, with a circumferential peripheral surface, having a coupling length. A flexibility slot extends from the rear surface opening to the major surfaces, along the cutting head axis, having a slot length and a head slot length. The coupling length is equal to or less than half the head slot length, and the slot length is equal to or greater than half the cutting head length. The cutting head is self-clamped into a tool shank with female coupling portion, by a friction fit between the male and female portion peripheral surfaces, causing the cutting head to elastically deform.

16 Claims, 4 Drawing Sheets

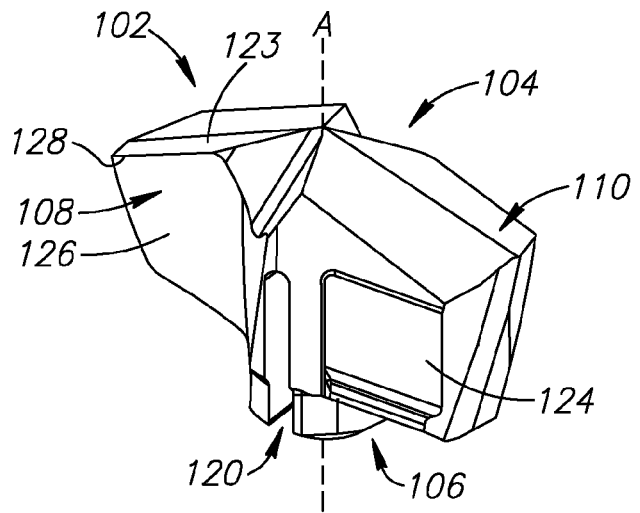
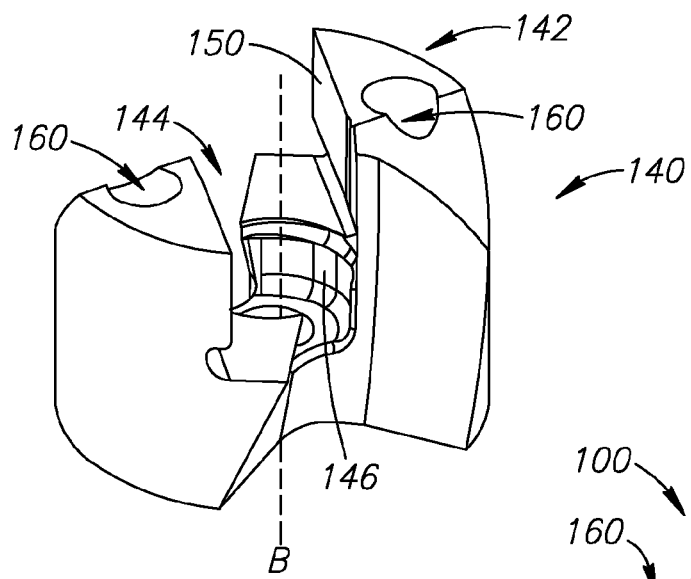
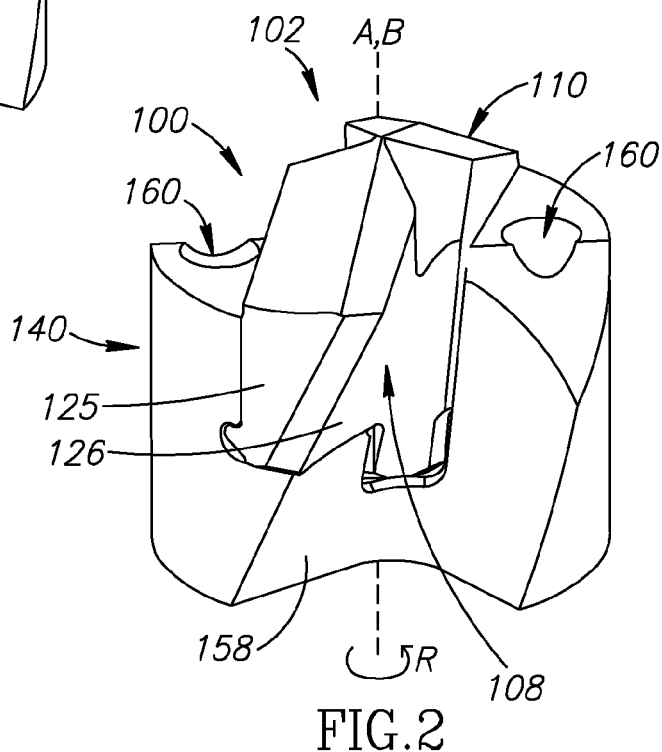
FIG.1
FIG.2

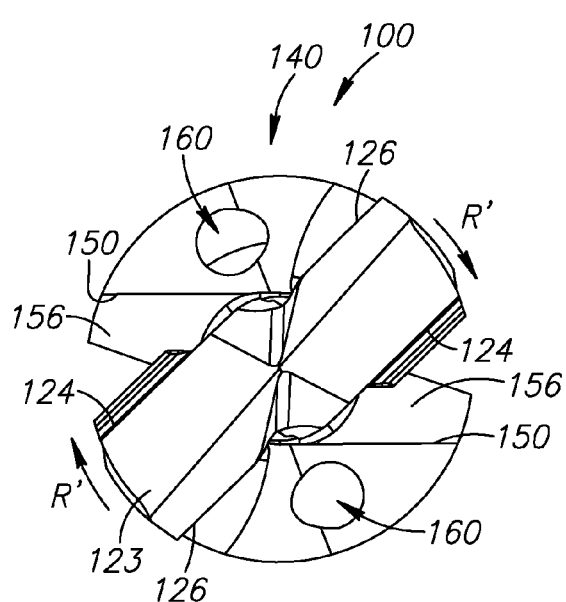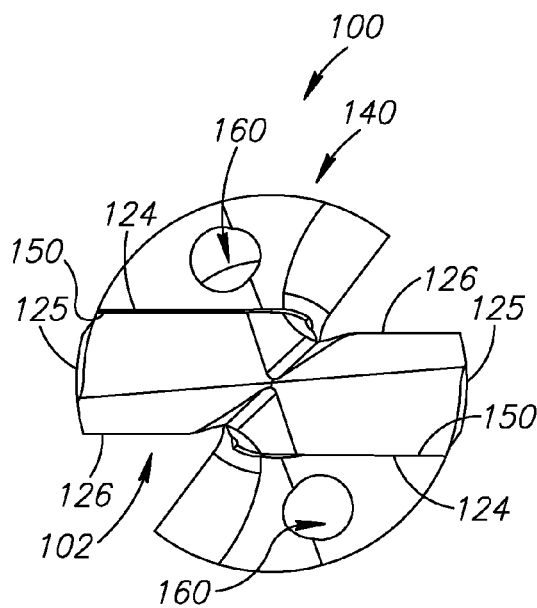
FIG.9A    FIG.9B
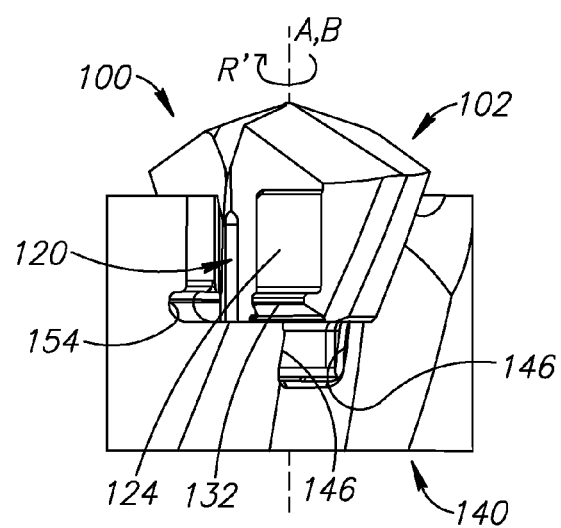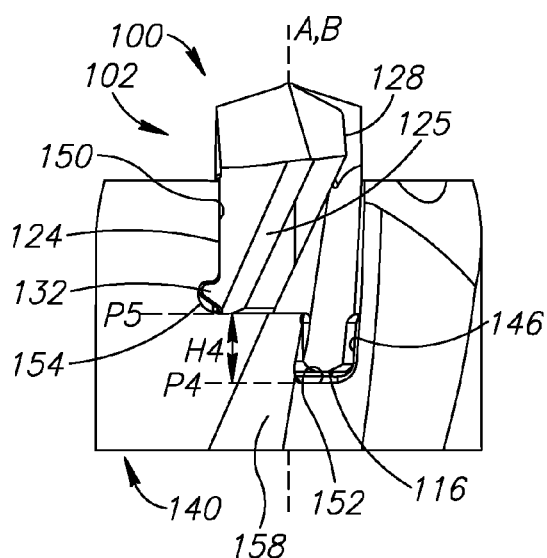
FIG.10A    FIG.10B

CUTTING TOOL AND CUTTING HEAD WITH A RESILIENT COUPLING PORTION

FIELD OF THE INVENTION

The present invention relates to cutting tools, in which a cutting head is resiliently and removably self-clamping in a tool shank holder by a friction fit, in general, and to a cutting head having a single flexibility slot for mounting into such a holder, in particular.

BACKGROUND OF THE INVENTION

Cutting tools, and in particular drills, may include a cutting head or drill head which is removably secured in a tool holder, either by a fastening member (e.g., a screw), or by a resilience force. The cutting head is fastened to the tool holder prior to operation in metal cutting, such as drilling. The cutting head is typically made of a hard metal, such as cemented carbide. The tool holder may be made of steel, or also of a hard material, such as cemented carbide. Examples of such cutting tools and cutting heads are disclosed in U.S. Pat. Nos. 2,621,548, 5,228,812, 5,863,162, 6,695,551, 6,059,492, 7,048,480, 7,407,350 , US2010/143059, US2010/155144 and US2012/003056.

It is an object of the subject matter of the present application to provide an improved and novel cutting head having a single flexibility slot for resiliently self-clamping into a compatible tool shank holder.

SUMMARY OF THE INVENTION

In accordance with the subject matter of the present application, there is provided a cutting head, having a longitudinal cutting head axis extending in a forward to rearward direction, comprising:

two opposing major surfaces and a head peripheral surface extending therebetween, the head peripheral surface having a base portion at a rearward end of the cutting head, with a base plane defined by the base portion and perpendicular to the cutting head axis, and a forward portion at a forward end of the cutting head, intersecting the cutting head axis at a forward intersection point;

a male coupling portion, protruding from the base portion and extending rearwards along the cutting head axis, the male coupling portion having a coupling portion rear surface spaced apart from the base portion and a male portion peripheral surface extending therebetween, and a rear surface plane defined by the rear surface and perpendicular to the cutting head axis; and a flexibility slot extending from the coupling portion rear surface in the forward direction, opening out to the two major surfaces, and having a longitudinal slot length with a head slot length extending forwardly from the base plane;

wherein a coupling length between the rear surface plane and the base plane is smaller than the head slot length.

In accordance with the subject matter of the present application, there is also provided a cutting tool having an axis of rotation extending in a forward to rearward direction, and around which the cutting tool rotates in a direction of rotation, the cutting tool comprising:

a tool shank having a female coupling portion at a shank forward end thereof, the female coupling portion comprising at least one female portion peripheral surface extending along and parallel to the axis of rotation, and arranged circumferentially there about; and a cutting head as described above, having the flexibility slot dividing the cutting head into two cutting head segments, wherein:

in an assembled position, the cutting head is resiliently secured to the shank forward end by a friction fit applied between the male portion peripheral surface and the at least one female portion peripheral surface; and the cutting head is elastically deformed with the respective part of the male coupling portion of each of the head segments pressed towards the cutting head axis.

BRIEF DESCRIPTION OF THE DRAWINGS

For a better understanding of the present invention and to show how the same may be carried out in practice, reference will now be made to the accompanying drawings, in which:

FIG. 1 is a perspective view of a cutting tool according to the present invention, in a disassembled position;

FIG. 2 is a perspective view of the cutting tool of FIG. 1, in an assembled position;

FIG. 9A is a front view of the cutting tool of FIG. 1, in a partially assembled position;

FIG. 9B is a front view of the cutting tool of FIG. 1, in the assembled position;

FIG. 10A is a side view of the cutting tool of FIG. 1, in the partially assembled position; and FIG. 10B is another side view of the cutting tool of FIG. 1, in the assembled position.

Figure 3:
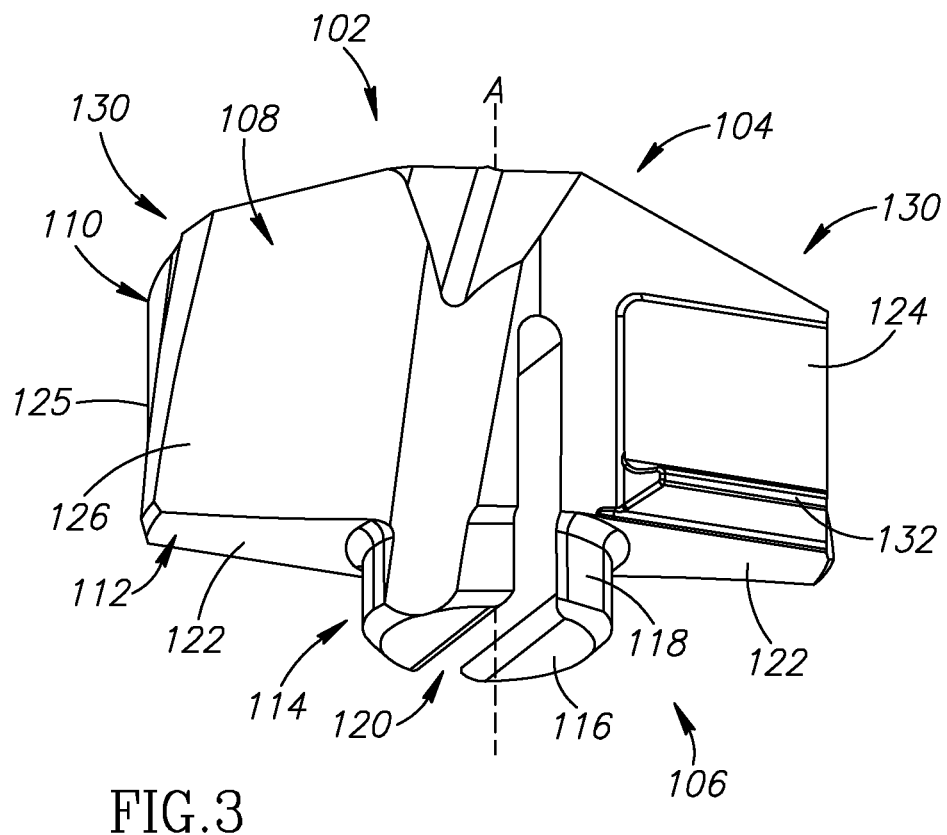
FIG. 3 is a perspective view of the cutting head of the cutting tool of FIG. 1.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to FIGS. 1 and 2, showing a cutting tool 100 in accordance with an embodiment of the disclosed technique. The cutting tool 100 is a rotary cutting tool, such as a drill, having an axis of rotation B, extending in a forward $D_F$ to rearward direction $D_R$. The cutting tool 100 includes a cutting head 102 removably mounted in a self-clamping manner on a tool shank 140 (FIG. 2). The cutting tool 100 rotates about the axis of rotation B in a direction of rotation R. The cutting head 102 may be of the sort used in metal cutting operations and thus can be termed a metal cutting head, meaning that the cutting head may be used for cutting metal, not necessarily that the cutting head is made of metal.

With further reference to FIG. 3-6, different views of the cutting head 102 are shown. The cutting head 102 has a longitudinal cutting head axis A, extending in the forward $D_F$ to rearward direction $D_R$. The longitudinal cutting head axis A also serves as an axis of rotation, when the cutting head 102 is operated in metal cutting. The cutting head 102 extends between a forward cutting end 104 and a rearward mounting end 106, and includes two opposing major surfaces 108. A head peripheral surface 110 extends between the two major surfaces 108, and has a base portion 112 at the rearward end 106, a forward portion 123 at the forward end 104, and side portions 125 extending therebetween. A base plane P2 defined by the base portion 112 is perpendicular to the cutting head axis A.

A resilient male coupling portion 114 protrudes from the base portion 112 and extends rearwards along the cutting head axis A. The male coupling portion 114 has a coupling portion rear surface 116 spaced apart from the base portion 112. A male portion peripheral surface 118 extends between the coupling portion rear surface 116 and the base portion 112, located circumferentially about the cutting head axis A. According to some embodiments, as depicted in the Figures, in a non-binding manner, the male portion peripheral surface 118 has a substantially cylindrical shape. Alternatively, the male portion peripheral surface 118 may have another shape, which is not necessarily cylindrical. A rear surface plane P1 defined by the rear surface 116 is perpendicular to the cutting head axis A.

Figure 4:
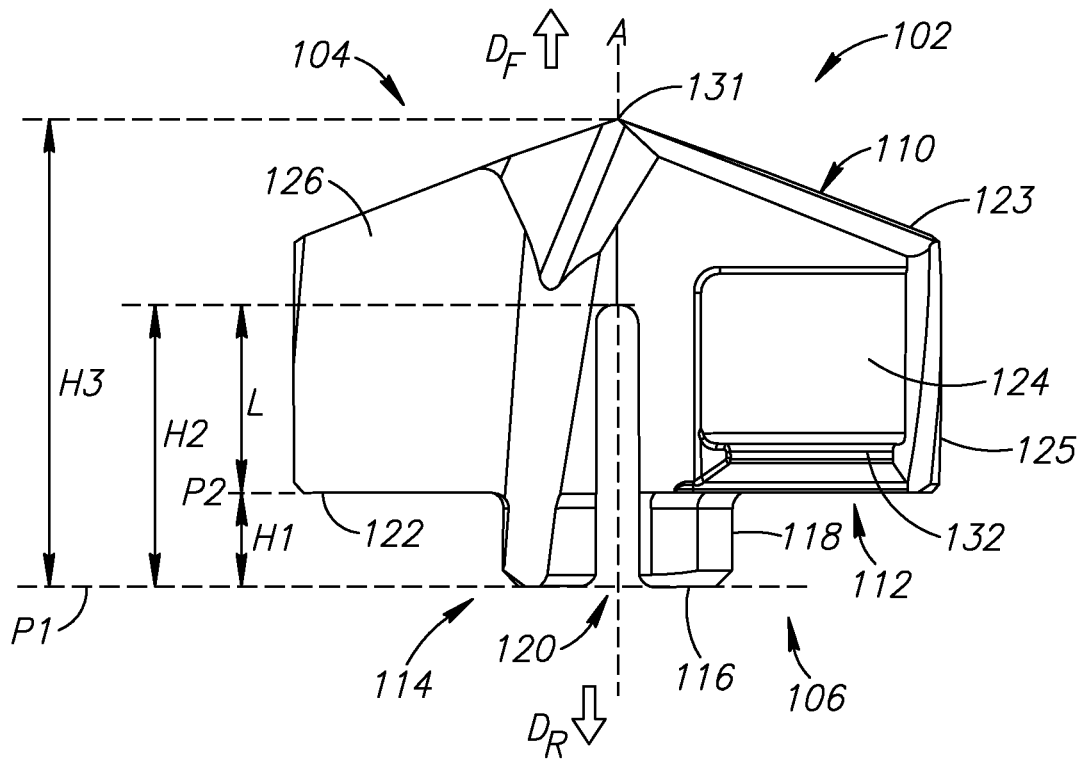
FIG. 4 is a side view of the cutting head of FIG. 3.
Figure 5:
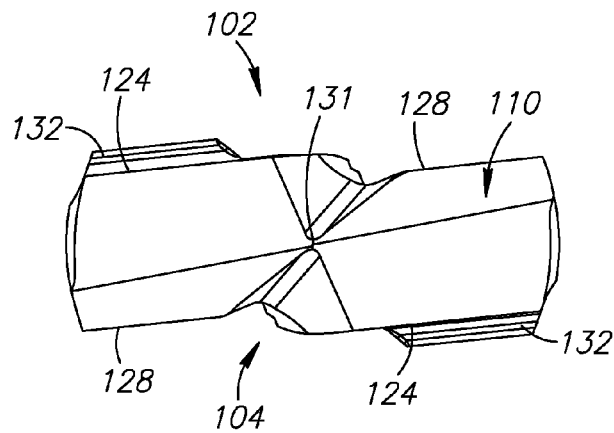
FIG. 5 is a front view of the cutting head of FIG. 3.
Figure 6:
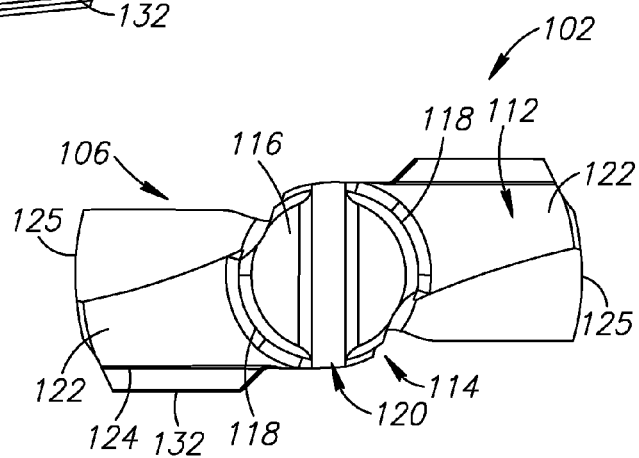
FIG. 6 is a rear view of the cutting head of FIG. 3.

The cutting head 102 further includes a flexibility slot 120 extending from the coupling portion rear surface 116 in the forward direction $D_F$, opening out to the two major surfaces 108, and having a longitudinal slot length H2 (FIG. 4). The flexibility slot 120 divides the cutting head 102 into two cutting head segments 130. The cutting head segments 130 are identical, however inversed by rotation about the cutting head axis A. The flexibility slot 120 allows the cutting head 102 to be elastically deformed, such that the male coupling portion 114 of each of the cutting head segments 130 approaches the cutting head axis A, when sufficient force is applied on the side portions 125 of the cutting head segments 130 in the direction of the cutting head axis A.

Viewing the cutting head 102 along the cutting head axis A in a side view, as depicted in FIG. 4, the slot length H2 has a head slot length L, extending forwardly from the base plane P2, into the body of the cutting head 102, until the forward end of the flexibility slot 120. A coupling length H1, extending between the rear surface plane P1 and the base plane P2, is smaller than the head slot length L of the flexibility slot 120. In other words, the length of the portion of the flexibility slot 120 which extends through the male coupling portion 114 is smaller than the length of the portion of the flexibility slot 120 which extends forwardly of the male coupling portion 114. In a particular embodiment, the coupling length H1 is equal to or less than a half of the head slot length L (i.e., H1≤L/2).

Further, the cutting head 102 has a cutting head length H3 measured along the cutting head axis A, between the coupling portion rear surface 116 and the forward intersection point 131, and the slot length H2 is equal to or greater than half of the cutting head length H3 (i.e., H2≥H3/2). In a particular embodiment, the slot length H2 equals two thirds or the cutting head length H3 (i.e., H2=H3*⅔).

The above relations between the lengths H1, H2, L and H3 yield that the cutting head 102 is considered to have a "shallow" self-clamping coupling with the tool shank 140. This is an advantage of the cutting head 102, making it more resilient to breakage, since the torque affected on the "shallow" self-clamping male coupling portion 114 is smaller than other cutting heads having a "deeper" self-clamping coupling arrangement (i.e., having a greater coupling length).

The base portion 112 of the cutting head 102 further includes two head axial abutment surfaces 122, extending perpendicular to and symmetrically around the cutting head axis A. The head axial abutment surfaces 122 extend from the side portions 125 of the head peripheral surface 110 towards the male portion peripheral surface 118.

Each of the major surfaces 108 further includes a head radial abutment surface 124, extending along the cutting head axis A. Each head radial abutment surface 124 extends from the head peripheral surface 110 towards the cutting head axis A, such that the two radial abutment surfaces 124 are arranged symmetrically around the cutting head axis A. Two retaining ledges 132 extend circumferentially from rearward ends of the head radial abutment surface 124, along the respective head axial abutment surface 122.

Further, each of the major surfaces 108 further includes a leading surface 126, extending along the cutting head axis A. Each leading surface 126 extends from the head peripheral surface 110 towards the cutting head axis A, and intersects with the forward and side portions 123, 125 of the head peripheral surface 110 at a cutting edge 128. The leading surfaces 126 are arranged symmetrically about the cutting head axis A.

Figure 7:
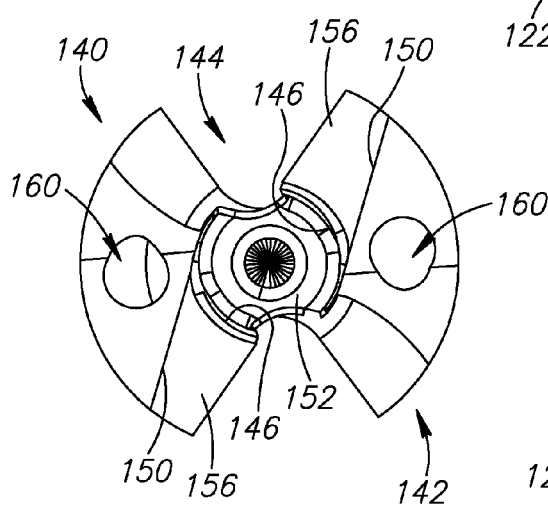
FIG. 7 is a front view of the tool shank of the cutting tool of FIG. 1.

As depicted in FIG. 1, the tool shank 140 has a generally cylindrical shape, having a shank forward end 142 with a female coupling portion 144. With further reference to FIG. 7, the tool shank 140 is viewed perpendicular to the axis of rotation B, in a front view. The female coupling portion 144 includes a rearmost female portion base 152, and at least one female portion peripheral surface 146. The female portion peripheral surfaces 146 extend from the rearmost female portion base 152 in the forward direction $D_F$, along and in parallel to the axis of rotation B. A shank rearmost plane P4 defined by the rearmost female portion base 152 is perpendicular to the axis of rotation B. The female portion peripheral surfaces 146 are arranged circumferentially about the axis of rotation B. According to some embodiments, and as depicted in the figures in a non-binding manner, the female portion peripheral surfaces 146 are arranged substantially cylindrically about the axis of rotation B. Alternatively, the female portion peripheral surfaces 146 may have another shape, which is not necessarily cylindrical.

The tool shank 140 further includes two shank radial abutment surfaces 150, located at the shank forward end 142, and extending parallel to the axis of rotation B. The shank radial abutment surfaces 150 are arranged symmetrically about the axis of rotation B. A shank axial abutment surface 156 extends from a respective one of the shank radial abutment surface 150, circumferentially and perpendicular to the axis of rotation B. An axial abutment plane P5 defined by the shank axial abutment surfaces 156, is perpendicular to the axis of rotation B. A retaining undercut 154 extends circumferentially from each of the shank axial abutment surfaces 156, for receiving a respective one of the retaining ledges 132 of the cutting head 102. The tool shank 140 also includes two flute portions 158, arranged at the circumference of the tool shank 140 symmetrically about the axis of rotation B, for guiding metal cutting chips away from the cutting head during metal cutting operations. It should be noted, that although not binding, the drawings of the present application depict that the tool shank 140 includes two female portion peripheral surfaces 146, separated by apertures extending along the flute portions 158.

The cutting head 102 is configured to be mounted on the tool shank 140 and securely affixed thereto in order to reach the assembled position as shown in FIGS. 2, 9B and 10B. The assembled position is suitable for employing the cutting tool 100 in metal cutting operations, such as drilling. Starting from the disassembled position shown in FIG. 1, with the cutting head 102 and the tool shank 140 separated from one another, but having the cutting head axis A aligned with the axis of rotation B. The cutting head 102 and the tool shank 140 are brought together along the axis of rotation B until the male coupling portion 114 is located in the female coupling portion 144 as shown in FIG. 10A, in a partially assembled position. From the partially assembled position, the cutting head 102 is rotated about the cutting head axis A, relative to the tool shank 140, in a direction of fixation R', opposite the direction of rotation R, until reaching the assembled position shown in FIGS. 2, 9B and 10B. In this position, the cutting head 102 is resiliently secured to the shank forward end 142 by a friction fit applied between the male portion peripheral surface 118 and the female portion peripheral surfaces 146. In the partially assembled and assembled positions, the cutting head axis A coincides with the axis of rotation B.

In the assembled position, each one of the head radial abutment surfaces 124 of the cutting head 102 abuts a respective one of the shank radial abutment surfaces 150 of the tool shank 140, and each one of the head axial abutment surfaces 122 abuts a respective one of the shank axial abutment surfaces 156. Further, in the assembled position, each flute portion 158 of the tool shank 140 forms an extension of the respective leading surface 126 of the cutting head 102 and the retaining ledges 132 of the cutting head 102 are received within the retaining undercuts 154 of the tool shank 140. In this manner, if a forward force is applied on the cutting head 102, attempting to pull the cutting head 102 out of the tool shank 140, the retaining ledges 132 are confined by the retaining undercuts 154, thereby preventing the cutting head 102 from being pulled out by the forward force. It should be noted, that in the assembled position, the coupling portion rear surface 116 of the cutting head 102 is spaced apart from the female portion base 152.

The male and female coupling portions 114, 144 are designed to have a friction fit between them so that in the assembled position (FIGS. 2, 9B and 10B) the male coupling portion 114 is securely held in the female coupling portion 144. Such a friction fit between the male and female coupling portions 114, 144 is achieved by forming the male and female coupling portions 114, 144 so that the diameter of the male coupling portion 114 is larger than the diameter of the female coupling portion 144 in at least a portion of the circumference of the male and female peripheral surfaces 118, 146.

The flexibility slot 120 provides a certain degree of elasticity to the male coupling portion 114 enabling the diameter of the male coupling portion 114 (that is, the diameter in any cross section of the male coupling portion 114 taken perpendicular to the cutting head axis A and through the male coupling portion 114), to be made smaller by applying a force perpendicular to the flexibility slot 120. By applying such a force, the cutting head 102 is elastically deformed such that the parts of the male coupling portion 114, respective of the two head segments 130, are pulled closer to each other, each towards the cutting head axis A. As a result, a resilience force acts on the male coupling portion 114, urging the head segments 130 apart to their original position, thereby pressing the male portion peripheral surface 118 against the female portion peripheral surfaces 146.

As noted above, the slot length H2 is equal to or greater than half of the cutting head length H3 (H2≥H3/2). Having such typical relation between the slot length H2 and the cutting head length H3, the flexibility slot 120 is considered to be a "long" slot, providing better flexibility to the cutting head 102. Such a "long" slot allows for a greater amount of elastic deformation of the cutting head 102 when the male coupling portion 114 is clamped into the female coupling portion 144 with a friction fit, as described above.

Further, as noted above, the cutting head 102 is considered to have a "shallow" self-clamping coupling with the tool shank 140, meaning that the tool shank 140 has a "shallow" female coupling portion. The distance between the shank rearmost plane P4 and the axial abutment plane P5, is referred to as a shank coupling length H4, as indicated in FIG. 10B. Having a "shallow" shank coupling length is also an advantage of the tool shank 140, making it more resilient to breakage, since the forces and torques effected on the "shallow" self-clamping female coupling portion 144 are smaller than other tool shanks having a "deeper" self-clamping coupling arrangement (i.e., with a longer shank coupling length H4).

It should be noted that the cutting head 102 of the present application has a "long" flexibility slot 120, thus maintaining better flexibility of the cutting head 102 when clamped in the tool shank 140. Further, the cutting head 102 has a "shallow" male coupling portion 114, thus making the cutting head 102 more resilient to breakage under operational torque and forces, as explained herein above.

Figure 8:
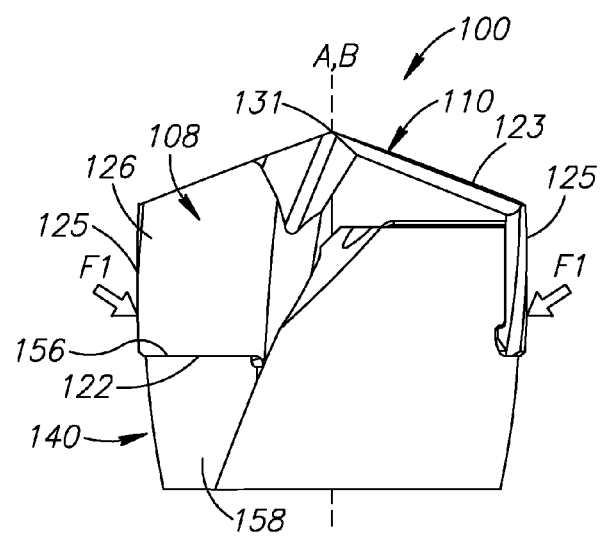
FIG. 8 is a side view of the cutting tool of FIG. 1, in the assembled position.

Reference is further made to FIG. 8, in which the assembled cutting tool 100 is viewed perpendicular to the axis of rotation B, in a side view. Since the parts of the male coupling portion 114, respective of the two head segments 130, are pulled closer to each other towards the cutting head axis A, the side portions 125 of the head peripheral surface 110 are pulled rearwards and slightly towards the cutting head axis A. Thus, a first force F1 acts on the side portions 125 of the head peripheral surface 110, in the rearward direction $D_R$ and towards the cutting head axis A, pressing the head axial abutment surfaces 122 of the cutting head 102 further against the shank axial abutment surfaces 156.

When the cutting tool 100 is employed in metal cutting, it rotates in the direction of rotation R, and a reverse force is applied on the cutting head 102, in the direction R', opposite to the direction of rotation R. This reverse force further assists in maintaining the cutting head 102 clamped tight within the tool shank 140 during operation.

In other known self-clamping cutting heads for drills, the resilience pressure is maintained in the vicinity of the male coupling member of the cutting head, in particular near the resilience slot at the male coupling member. However, in the present invention, since there is only a single flexibility slot 120, the elastic deformation of the cutting head 102 causes the first force F1 to be applied on the side portions 125 of the head peripheral surface 110, rather than in the vicinity of the male coupling portion 114.

The cutting head 102 may be removed from the tool shank 140, for example, when the cutting edge 128 has worn out and the cutting head 102 needs to be replaced by another. In order to remove the cutting head 102, it is rotated about the cutting head axis A, relative to the tool shank 140, in the direction of rotation R, until reaching the partially assembled configuration shown in FIGS. 9A and 10A. In the partially assembled position, the retaining ledges 132 of the cutting head 102 are spaced apart from the retaining undercuts 154 of the tool shank 140, and the friction fit is no longer applied between the male portion peripheral surface 118 and the female portion peripheral surfaces 146. From the partially assembled configuration, the cutting head 102 can be removed from the tool shank 140 by moving the cutting head 102 and the tool shank 140 apart along the axis of rotation B until arriving at the disassembled configuration, as shown in FIG. 1.

The tool shank 140 of the present invention may further include coolant channels 160, to provide coolant fluid towards the cutting head 102, in particular towards the cutting edge 128, in order to reduce the temperature in the contact area between the cutting head 102 and the work piece during metal cutting operations. It should be noted, that the tool shank 140 of the present invention is particularly suitable to be made of hard metal, such as cemented carbide, in order to withstand high temperatures during metal cutting operations.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting head (102), having a longitudinal cutting head axis (A) extending in a forward ($D_F$) to rearward direction ($D_R$), comprising:
    two opposing major surfaces (108) and a head peripheral surface (110) extending therebetween, the head peripheral surface (110) having a base portion (112) at a rearward end (106) of the cutting head (102), with a base plane (P2) defined by the base portion (112) and perpendicular to the cutting head axis (A), and a forward portion (123) at a forward end (104) of the cutting head (102), intersecting the cutting head axis (A) at a forward intersection point (131);
    a male coupling portion (114), protruding from the base portion (112) and extending rearwards along the cutting head axis (A), the male coupling portion (114) having a coupling portion rear surface (116) spaced apart from the base portion (112) and a male portion peripheral surface (118) extending therebetween, and a rear surface plane (P1) defined by the rear surface (116) and perpendicular to the cutting head axis (A); and
    a flexibility slot (120) extending from the coupling portion rear surface (116) in the forward direction ($D_F$), opening out to the two major surfaces (108), and having a longitudinal slot length (H2) with a head slot length (L) extending forwardly from the base plane (P2);
    wherein the rear surface plane (P1) defines the rearwardmost portion of the cutting head (102); and
    wherein a coupling length (H1) between the rear surface plane (P1) and the base plane (P2) is smaller than the head slot length (L).

2. The cutting head (102) according to claim 1, wherein the cutting head (102) has a cutting head length (H3) measured along the cutting head axis (A) between the rear surface plane (P1) and the forward intersection point (131), and the slot length (H2) is equal to or greater than half of the cutting head length (H3).

3. The cutting head (102) according to claim 1, wherein the coupling length (H1) is equal to or less than a half of the head slot length (L).

4. The cutting head (102) according to claim 1, wherein the peripheral surface (118) has a substantially cylindrical shape.

5. The cutting head (102) according to claim 1, wherein the base portion (112) further includes two head axial abutment surfaces (122), extending perpendicular to and symmetrically around the cutting head axis (A), from the head peripheral surface (110) towards the male coupling portion (114).

6. The cutting head (102) according to claim 1, wherein each of the major surfaces (108) further includes a head radial abutment surface (124), extending along and arranged symmetrically around the cutting head axis (A), each head radial abutment surface (124) extends from the head peripheral surface (110) towards the cutting head axis (A).

7. The cutting head (102) according to claim 1, wherein each of the major surfaces (108) further includes a leading surface (126), extending along and arranged symmetrically about the cutting head axis (A), each leading surface (126) extends from the head peripheral surface (110) towards the cutting head axis (A), and intersects with a forward portion (123) of the head peripheral surface (110) at a cutting edge (128).

8. The cutting head (102) according to claim 1, wherein the slot length (H2) equals two thirds of the cutting head length (H3).

9. A cutting tool (100) having an axis of rotation (B) extending in a forward ($D_F$) to rearward direction ($D_R$), and around which the cutting tool (100) rotates in a direction of rotation (R), the cutting tool (100) comprising, in combination:
    a cutting head (102) according to claim 1, having the flexibility slot (120) dividing the cutting head (102) into two cutting head segments (130); and
    a tool shank (140) having a female coupling portion (144) at a shank forward end (142) thereof, the female coupling portion (144) comprising at least one female portion peripheral surface (146) extending along and parallel to the axis of rotation (B), and arranged circumferentially there about;
    wherein:
    in an assembled position, the cutting head (102) is resiliently secured to the shank forward end (142) by a friction fit applied between the male portion peripheral surface (118) and the at least one female portion peripheral surface (146); and
    the cutting head (102) is elastically deformed with the respective part of the male coupling portion (114) of each of the head segments (130) pressed towards the cutting head axis (A).

10. The cutting tool (100) of claim 9, wherein the at least one female portion peripheral surface (146) are arranged substantially cylindrically.

11. The cutting tool (100) of claim 9, wherein the female coupling portion (144) includes a rearmost female portion base (152), and in the assembled position the coupling portion rear surface (116) is spaced apart from the female portion base (152).

12. The cutting tool (100) of claim 9, wherein the tool shank (140) further includes two shank radial abutment surfaces (150), located at the shank forward end (142), extending parallel to, and arranged symmetrically about the axis of rotation (B), and wherein in the assembled position, each head radial abutment surface (124) abuts a respective shank radial abutment surface (150).

13. The cutting tool (100) of claim 9, wherein the tool shank (140) further includes two shank axial abutment surfaces (156), each extending circumferentially and perpendicular to the axis of rotation (B) from a respective one of the shank radial abutment surface (150), and wherein in the assembled position, each one of the head axial abutment surfaces (122) abuts a respective one of the shank axial abutment surfaces (156).

14. The cutting tool (100) of claim 9, wherein the cutting head (102) further includes two retaining ledges (132), each extending circumferentially from the respective head radial abutment surface (124), wherein the tool shank (140) further includes two retaining undercuts (154), extending circumferentially from the shank axial abutment surfaces (156), for receiving the retaining ledges (132) therein, in the assembled position.

15. The cutting tool (100) of claim 9, wherein the tool shank (140) further includes two flute portions (158), arranged symmetrically about the axis of rotation (B), and wherein in the assembled position, each flute portion (158) forms an extension of the respective leading surface (126).

16. The cutting tool (100) of claim 9, wherein in the assembled position, the cutting head axis (A) of the cutting head (102) coincides with the axis of rotation (B) of the cutting tool (100).

\* \* \* \* \*